United States Patent [19]

Finley

[11] Patent Number: 4,697,266

[45] Date of Patent: Sep. 29, 1987

[54] ASYNCHRONOUS CHECKPOINTING SYSTEM FOR ERROR RECOVERY

[75] Inventor: Rufus E. Finley, Yorba Linda, Calif.

[73] Assignee: Unisys Corp., Detroit, Mich.

[21] Appl. No.: 475,154

[22] Filed: Mar. 14, 1983

[51] Int. Cl.$^4$ .............................................. G06F 11/14
[52] U.S. Cl. ...................................... 371/12; 364/200; 364/300
[58] Field of Search ........ 364/184, 187, 200 MS File, 364/900 MS File; 371/7, 8, 10, 12, 11

[56] References Cited

U.S. PATENT DOCUMENTS

| | | | |
|---|---|---|---|
| 3,736,566 | 5/1973 | Anderson et al. | 364/200 |
| 3,959,778 | 5/1976 | Brette | 340/172.5 |
| 4,044,337 | 8/1977 | Hicks et al. | 364/200 |
| 4,333,144 | 6/1982 | Whiteside et al. | 364/200 |
| 4,458,307 | 7/1984 | McAnlis | 364/200 |
| 4,521,847 | 6/1985 | Ziehm et al. | 364/184 |

*Primary Examiner*—Gareth D. Shaw
*Assistant Examiner*—Kevin A. Kriess
*Attorney, Agent, or Firm*—Nathan Cass; Kevin R. Peterson; Edmund M. Chung

[57] ABSTRACT

A method of recovering from an error condition during operation of a program that is modifying a data base without corrupting the data base, wherein the program includes calls to record the progress of the operation in a table in memory. On the occurrence of an error condition, the tables for all programs in operation are transferred to a disk. During error recovery, the tables are returned to memory where the information stored in the respective tables is used by each active program to restore operation of the particular program to a point where the operation can be completed without corrupting the data base. Each program is designed to interrogate its own recovery table following the occurrence of an error condition to restore operation at a point where the integrity of the data base is assured.

9 Claims, 23 Drawing Figures

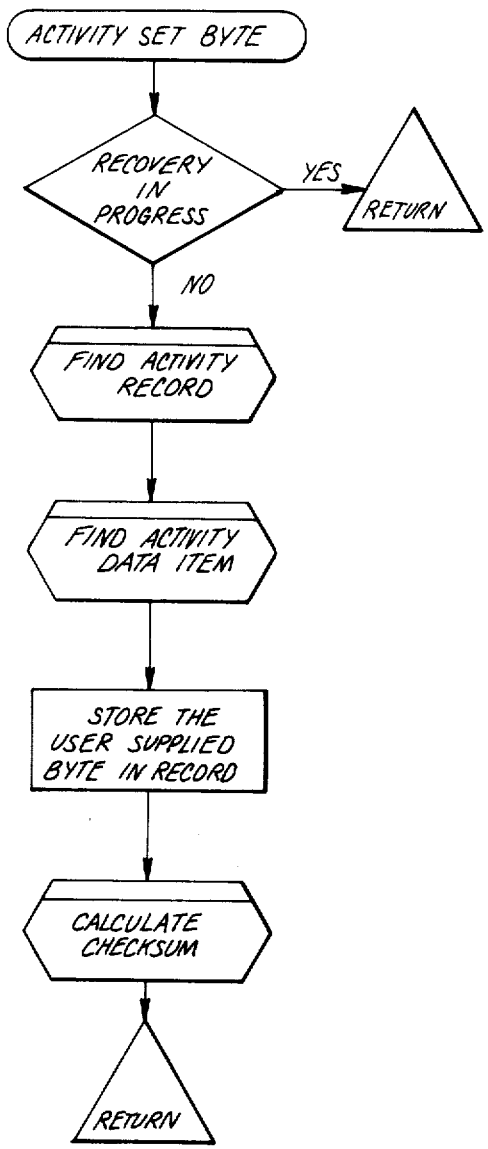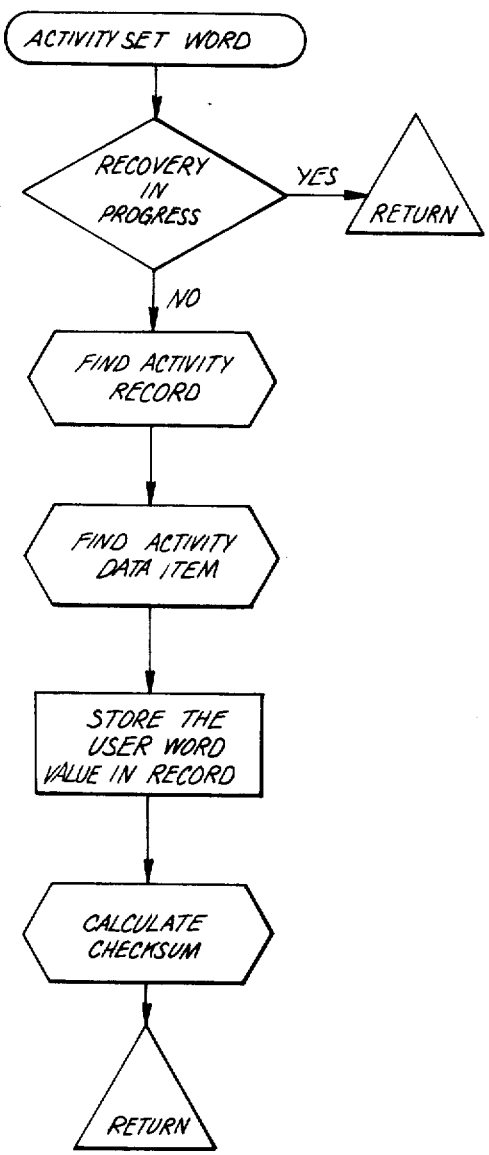

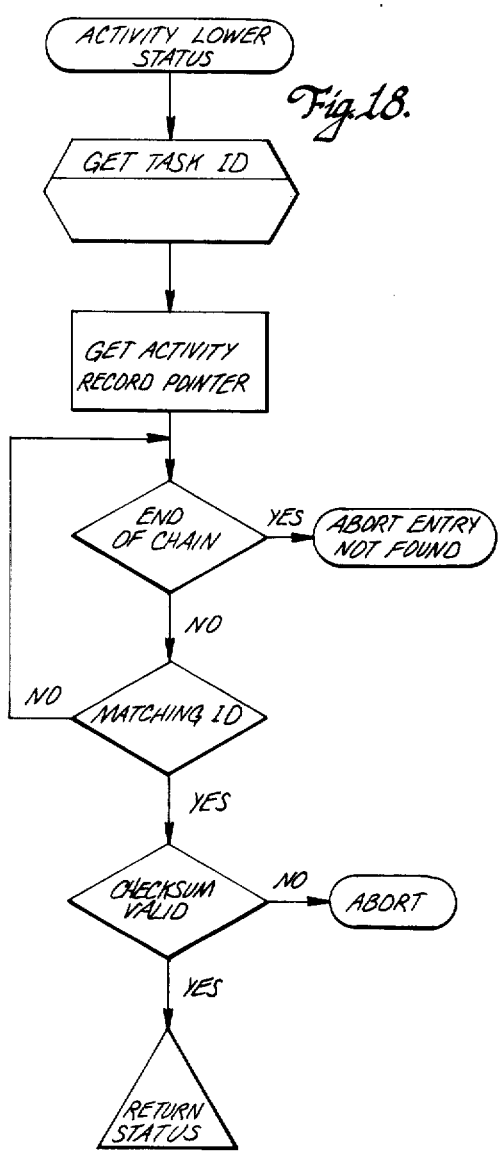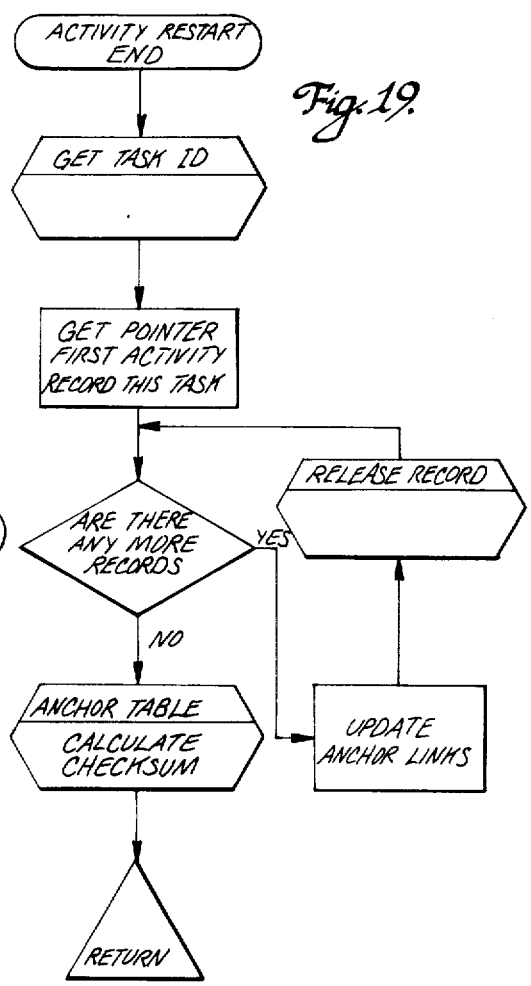

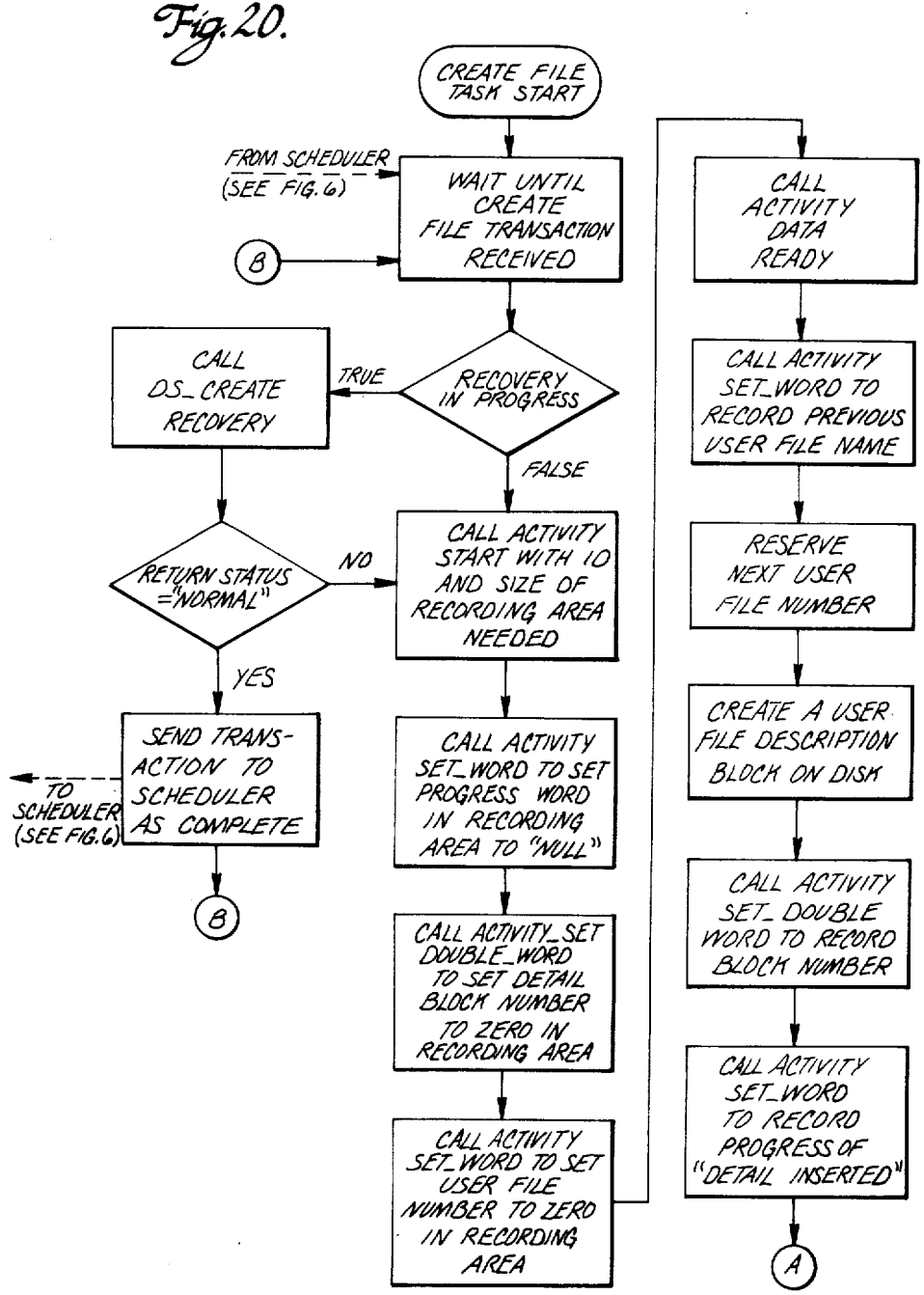

4,697,266

ASYNCHRONOUS CHECKPOINTING SYSTEM FOR ERROR RECOVERY

FIELD OF THE INVENTION

This invention relates to a data processing system for controlling a data base and, more particularly, is directed to a method and means for preventing data base corruption as a result of an unexpected system shutdown.

BACKGROUND OF THE INVENTION

In a data base management system, for example, for storing, updating and retrieval of information, such as data items stored in the form of records in one or more files, unexpected system shutdown may result in corruption of the data base and cause problems in restarting the data base management system. One well-known technique is to make a permanent updated record of the data base at fixed intervals of time, such as the beginning of a day, or the start of a new shift, or other convenient time. If the system experiences a shutdown due to power failure or some other problem, an uncorrupted data base can be duplicated using the backup recording and then repeating the operations that modify the data base from the time of the last backup recording. Such a system has obvious drawbacks in that duplicating a single day's or single shift operation to update the data base at best may involve many man-hours of effort and at worse may be impossible to reconstruct.

The concept of checkpointing has been proposed which provides for automatically halting processing at controlled intervals to make a magnetic tape or disk recording of the condition of all variables of the machine run. In the event of an error or interruption, restart procedures make it possible to continue processing from the last checkpoint rather than from the beginning of the machine run. Such known checkpointing techniques are under automatic system control in which checkpoints are established at processing intervals based on a certain number of items, transactions, or records having been processed. At each checkpoint, input and output records must be recorded along with the contents of storage areas and memory, as well as the contents of counters and registers in the processor. After an error or other interruption, the accuracy of processing up to that point must be verified and a restart procedure selected which re-enters the main routine at that point.

SUMMARY OF THE INVENTION

The present invention is directed to an improved method and means for error recovery to prevent data base corruption as a result of unexpected system shutdown. The error recovery system of the present invention may be called "distributed asynchronous checkpointing" since it is under software application control rather than automatic system control. The application software provides for the continuous recording of information needed to resolve data base inconsistencies or restart in the event of a system shutdown. The application software determines what data is temporarily stored in memory by the current task program and when it is to be recorded based on the particular function the software is currently performing. Even though several tasks may be active concurrently, each task checkpoints itself independently. A task as used herein is a collection of individual programs that operate as a single transaction performing a pre-specified function. Each task records this error recovery information in an area in memory which is identified by a unique identification number. If a task or particular activity within a task is completed, its recorded error recovery information is erased. However, if the data management system experiences an unexpected shutdown, all currently recorded error recovery information is transferred to the permanent storage, such as a disk. During a subsequent error recovery operation, the recorded information is returned to the random access storage; each task that was currently active when the system shut down can then interrogate the recorded information and take appropriate action to correct any inconsistencies based on the recorded information.

BRIEF DESCRIPTION OF THE DRAWINGS

For a more complete understanding of the invention, reference should be made to the accompanying drawings, wherein:

FIGS. 9-19 are flow diagrams of subroutine calls used to implement the error recovery operation; and FIGS. 20-23 are flow diagrams showing an example of a task using the error recovery system.

DETAILED DESCRIPTION

Figure 1:
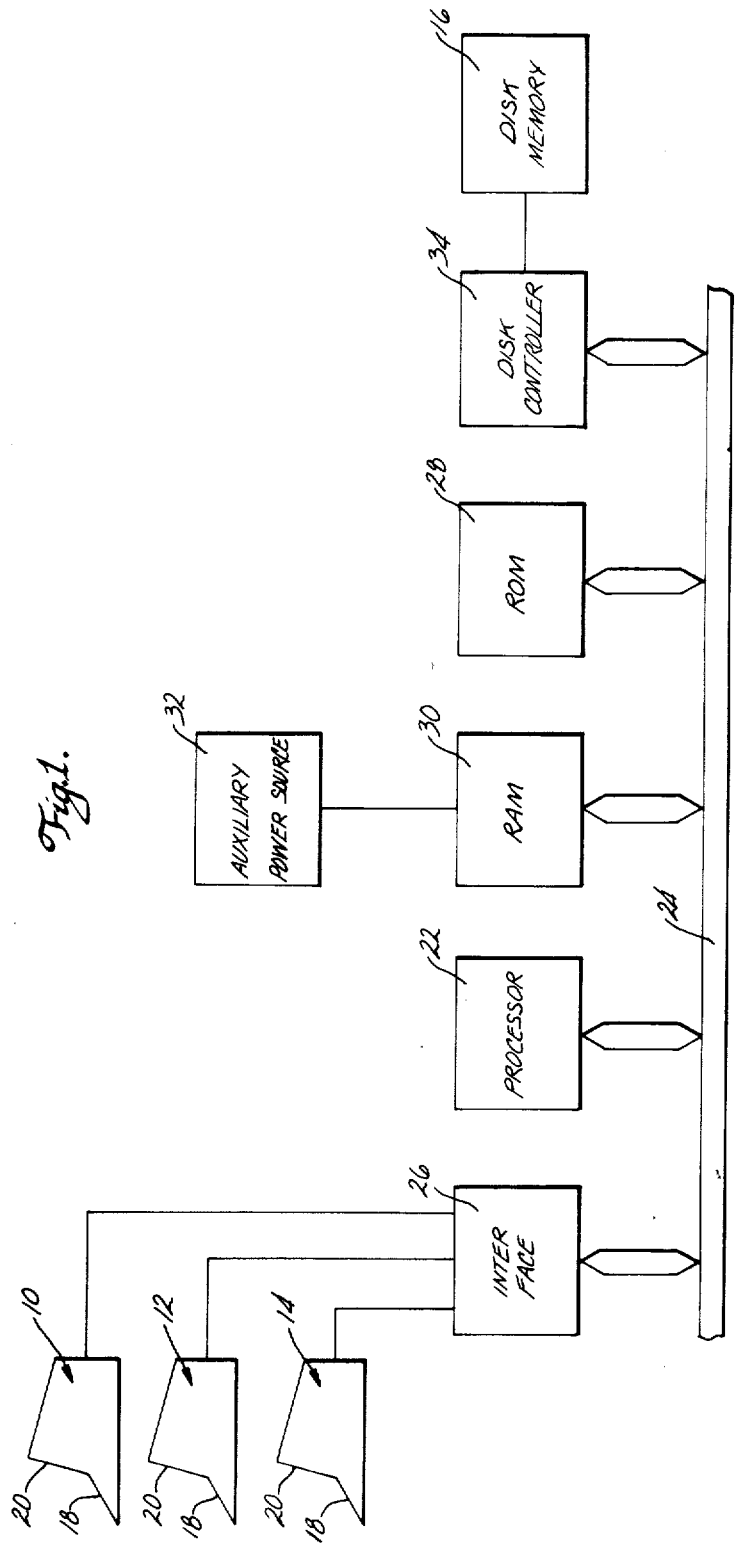
FIG. 1 is a block diagram of a digital data processing system embodying means and methods in accordance with the present invention.

The error recovery system of the present invention may be incorporated in any data processing system in which programs are executed that request block allocations in a bulk memory used for storing a data base, or that change data stored in the bulk memory. Such operations, if unexpectedly interrupted before completion, may corrupt the data base. Each program involving these types of activities contains calls to "activity recording services" to record sufficient information to support an orderly recovery following any unexpected interrruption. FIG. 1 shows an example of a typical hardware system which supports a data base stored in a bulk memory 16 such as a magnetic disk memory. The setting up of files on the disk, the storage of data in such files, or the changing of data in such files is under user control from a plurality of terminals, three of which are indicated at 10, 12, and 14 in FIG. 1. These terminals allow the users to communicate with the data base stored on the disk memory 16 by means of keyboards 18 at each terminal. Interaction with the user is provided by a CRT display 20 at each terminal.

Transfer of digitally coded information into and out of the user terminals is controlled by a processor 22 over a common bus 24. The terminals are connected to the bus through an interface 26. The processor 22 is controlled by programs stored in a read only memory (ROM) 28. The processor uses a random access memory (RAM) 30 as a temporary storage during execution of the program. The RAM has an auxiliary power source 32 which maintains power to the RAM in case of power failure to the system. Transfer of information to and from the disk memory 16 is through a disk controller 34 connected to the main bus 24. It will be seen that FIG. 1 represents conventional architecture of a digital data processing system.

Figure 2:
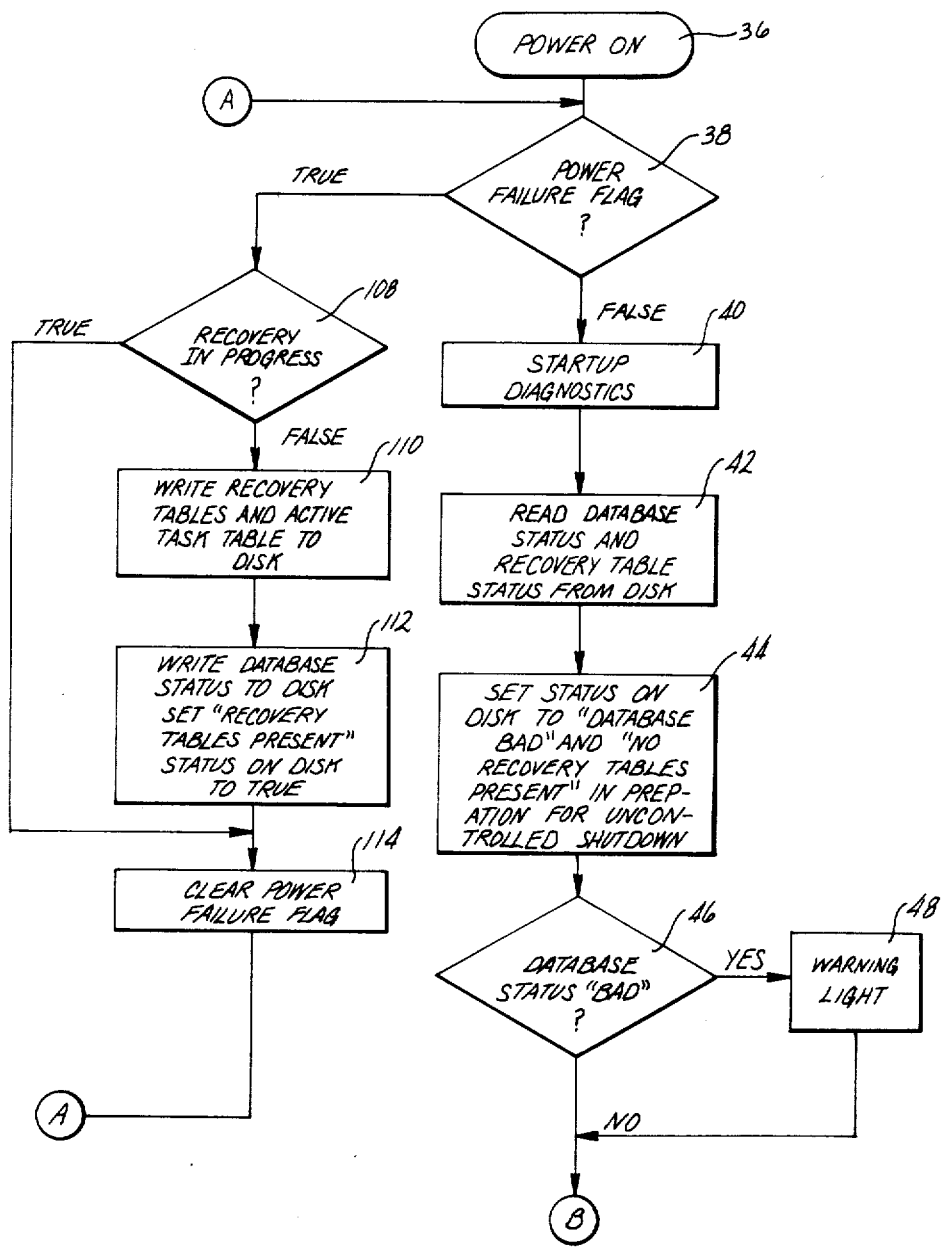
FIGS. 2, 3 and 4 are flow diagrams illustrating the overall operation of the data processing system of FIG. 1.
Figure 3:
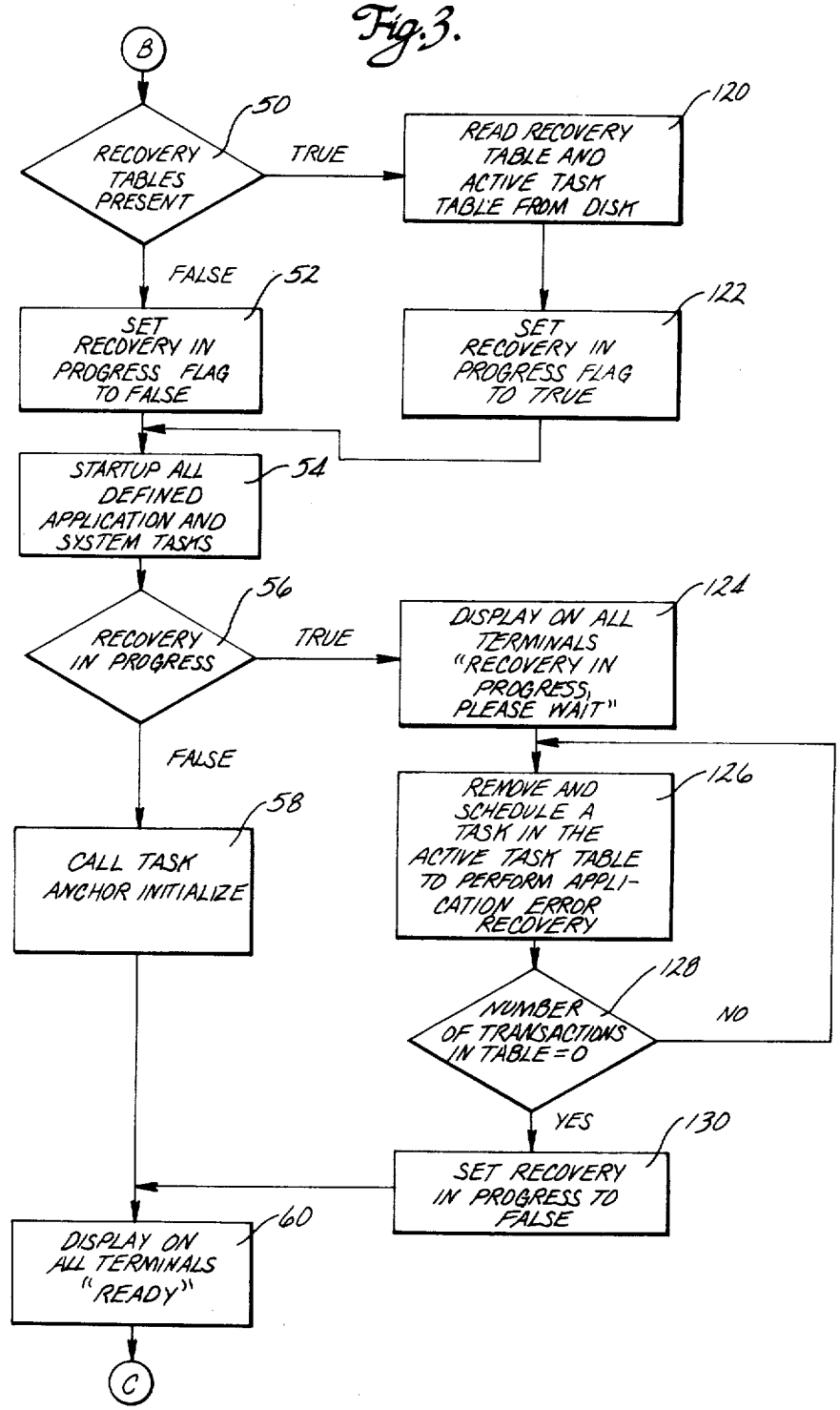
Figure 4:
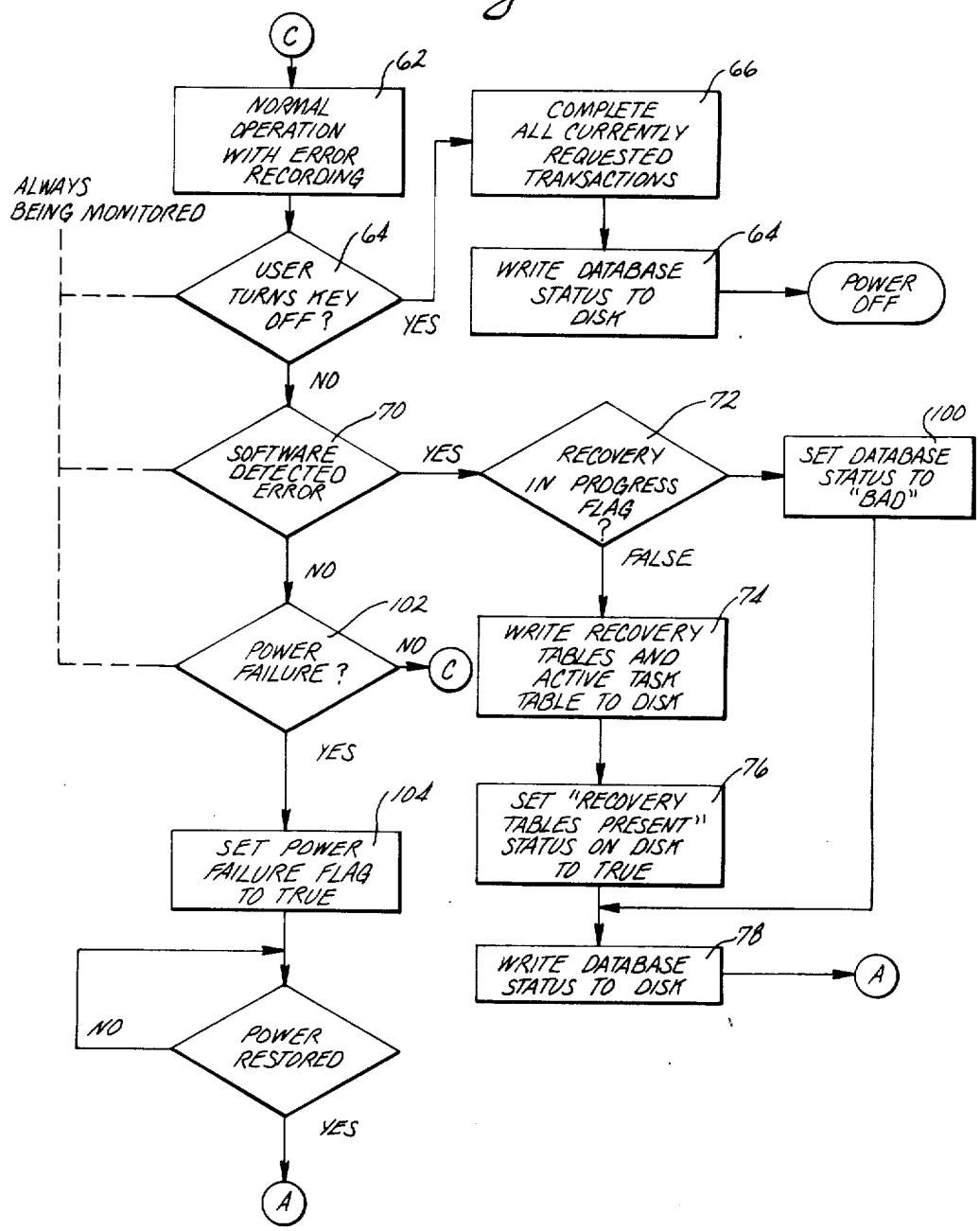

Referring to FIGS. 2, 3 and 4, the system operation under control of programs stored in the ROM 28 may be summarized as follows:

Once power is turned on to the system, as indicated at 36, a check is made (see 38 on FIG. 2) to determine whether there was a prior power failure which interrupted operation of the system. A power failure is one of the unexpected interruptions which causes shutdown of the system and invokes the error recovery procedure on restoration of power. Whenever there is a power failure during system operation, a Power Failure flag is set in a specific location in RAM 30 which is retained in RAM 30 by the auxiliary power source 32. The manner in which the Power Failure flag is set is described below. Assuming that the system is in an initial startup mode, the Power Failure flag will be false.

The system then enters an initial startup phase, indicated at 40, which "boots" the system and starts reading into the RAM 30 from the disk memory 16. This places the system in an initial operating phase.

The first operation of the system is to read two Status flags stored at a predetermined location on the disk and load these flags into predetermined locations in the RAM 30. As will be described in detail below, one flag indicates the status of the data base, namely, good or bad, and the other flag indicates whether or not a recovery table is stored on the disk. Following an initial power-up, both of these flags will be false. However, if there has been a prior unexpected interruption in the operation of the system due, for example, to a software detected error or a power failure, both of these flags will be true. Once the Data Base Status flag and the Recovery Table Status flag are stored in the RAM 30, these flags as stored on the disk are both reset to false in preparation for a possible uncontrolled shutdown of the system, as indicated at 44.

If the Data Base Status flag transferred from the disk to RAM 30 is true, indicating that the data base is corrupted due to an unexpected shutdown, a warning light is turned on at each of the user terminals, as indicated at 46 and 48 in FIG. 2. As shown at 50 in FIG. 3, the Recovery Table Status flag as stored in memory 30 is then checked. If a recovery table is present on the disk, as indicated by the Recovery Table Status flag being true, an error recovery procedure is required. However, assuming for the moment that the system is in an initial power-up phase, the Recovery Table Status flag will be false. This sets the Recovery in Progress flag in the RAM 30 to false, as indicated at 52. The system then causes all defined application and system tasks to be activated in anticipation of a user request from one of the terminals, as indicated at 54.

Figure 5:
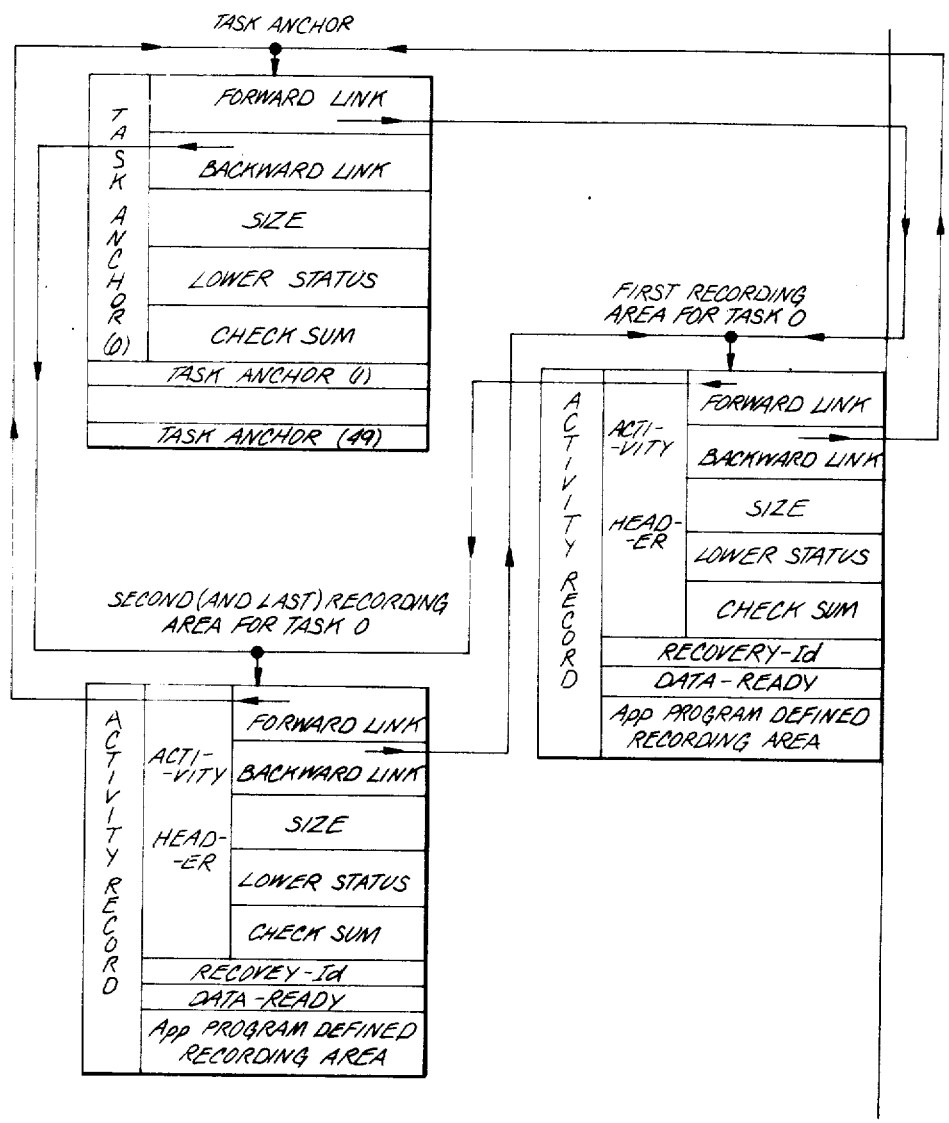
FIG. 5 is a chart of the recovery tables in memory.

Assuming that the Recovery in Progress flag is false, as determined at 56 in the flow diagram of FIG. 3, the operating program then calls an "activity anchor initialize" subroutine. The function of this subroutine is to set up a table of task anchors in memory for each of the tasks performed by any application programs called in response to user requests of a type that involve an error recovery procedure. User requests that only interrogate the data base do not corrupt the data base and so do not invoke any error recovery procedure. As seen in FIG. 5, task anchors for up to 50 tasks, for example, are established in RAM 30 at known locations. Each task anchor includes a forward link address and a backward link address which later are set to point to the first and last activity recording areas for the asociated task. These activity recording areas are used to store error recovery data during execution of the task programs. A task may have one or more activities which modifies the data base. If only one activity recording area is required for a particular task, the forward link and backward link in the task anchor will point to the same activity recording area. The initialized task anchors have the links pointing to the task anchor address. A Size word in the task-anchor is set to the size of the anchor table, a Lower Status word is set to zero, and a Checksum is calculated and stored. This is done for all the task anchors during initialization. At this point, the operating program indicates to the terminal users that the system is ready to operate.

Referring to the flow diagram of FIG. 4, as indicated at 62, the data processing system now functions in a normal manner to allow the users to allocate new files in the data base, readout data, add additional information to the file in the data base, or initiate any other transactions which the system is programmed to perform in managing the data base files.

Figure 6:
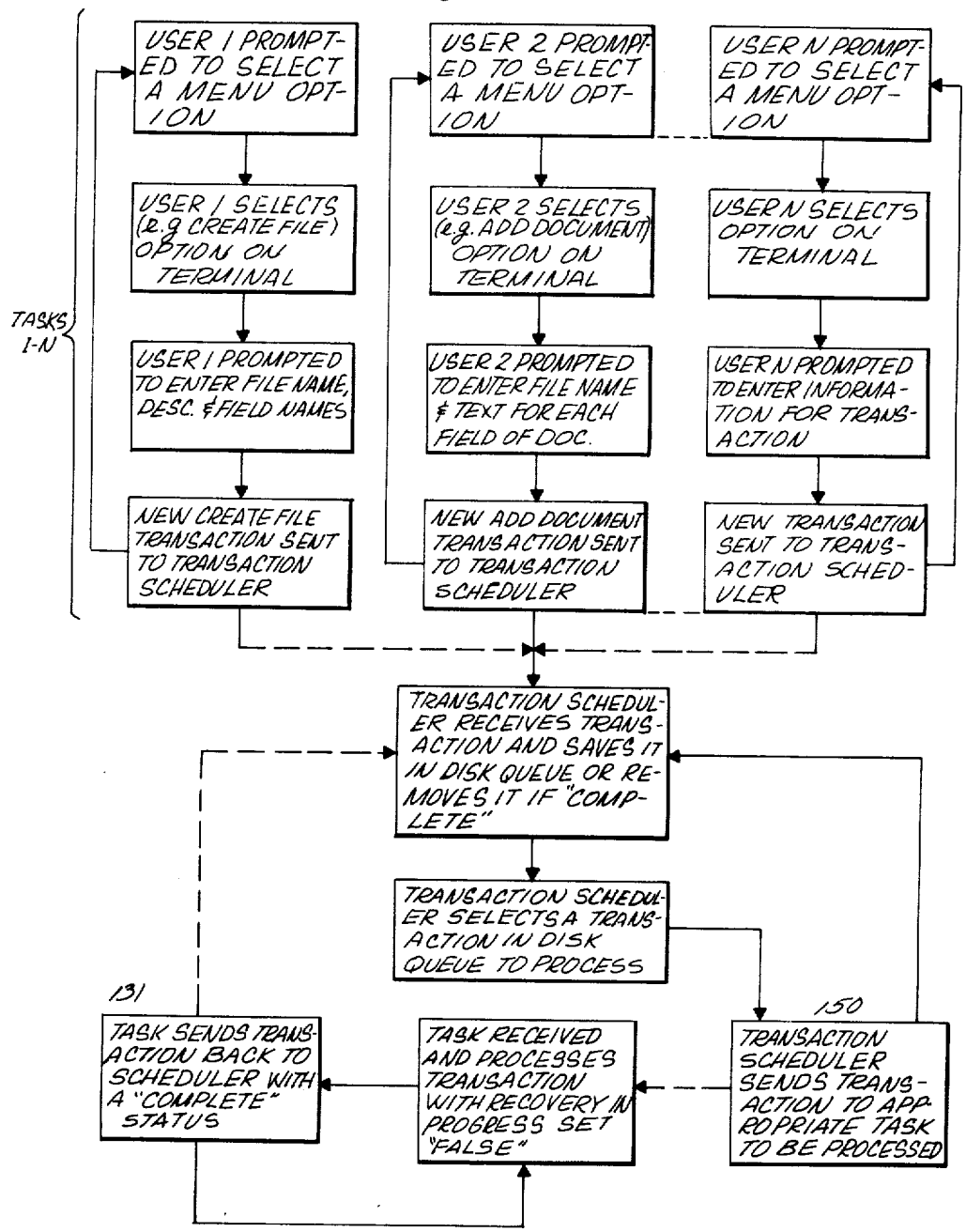
FIG. 6 is a flow chart of the system operation under normal operation.

Referring to FIG. 6, normal operation of the system with or without error recovery is summarized. Tasks 1—N operate at the input level to provide input from the respective terminals. Thus task 1 at the input level causes User #1 terminal to display a menu from which the user selects a particular option, e.g., create a file. Task 2 does the same at User #2 terminal and task N, of course, to the User #N terminal. Each task responds to the particular option selected by the user and prompts the user to enter additional information, depending on the option selected. For example, if User #1 selects an option to create a new file in the data base, task 1 will then prompt User #1 to enter additional information such as the file name, description and fields. The input task is completed by sending the new transaction to a transaction scheduler, which is a program task for initiating the transactions called by the several user terminals.

As noted above, each task is a collection of individual programs that operate as a single transaction performing a prespecified function. In FIG. 6, broken lines separate the tasks to indicate that each task may be active concurrently with other tasks. The processor switches between tasks using interrupts to provide a conventional multi-programming operation. The scheduler, which is a separate task, receives the specified transactions from the input tasks and saves them in a transaction queue on the disk. The queue identifies each transaction called for by a user and stores the associated input data from the user terminal. The scheduler selects a transaction in the queue to process and uses the transaction to activate an appropriate task to be executed by the processor. The scheduler removes the transaction from the queue when the scheduled task is completed. The scheduler causes the particular task to be executed, as indicated at 150 on FIG. 6. Under normal conditions, the Recovery in Progress flag is false since the task has not yet been initiated. When a particular transaction is complete, as indicated at 152, the scheduler is notified and removed from the disk queue.

During normal operation in the execution of any assigned task by the data processing system, the system continuously monitors three conditions which result in termination of operation. As shown in FIG. 4 at 64, if a user turns the key off on the system, all currently requested transactions are completed, the Data Base Status flag is set to true and stored in the disk, as indicated at 68, and then the power is shut off. A second condition which is monitored is a software detected error. The programs are written to contain ample checks to detect common types of program interface errors, unexpected changes to sensitive data in memory, inconsistent links in data base storage, out of range offset values and unexpected returns from call procedures. If any such condition is detected, as indicated at 70, the status of a Recovery in Progress flag is checked to determine whether the system is currently operating in a normal mode or in a recovery mode. Assuming that the system is currently operating in the normal mode so that the Recovery in Progress flag is false, the recovery tables and the active task table in memory are transferred to the disk, and the Recovery Table Present Status flag on the disk is set to true, as indicated at 94 and 96. The Data Base Status flag, which may be either good or bad at this stage, is also stored on the disk (see 98) and the system returns to the startup mode starting at "A" in FIG. 2. If the system is already in a recovery mode at the time a software error is detected, the system sets the Data Base Status flag in memory true, indicating that the data base status is bad. The Data Base Status flag is then written to disk and the system returns to the startup mode at "A".

A third unexpected event which is detected, as indicated at 102 in FIG. 4, is a complete power failure. A power failure does not result in an immediate loss of information stored in RAM because the RAM is provided with a backup battery power supply 32. A power failure causes the Power Failure flag stored in the RAM to be set to true, and the system remains in this condition until power is restored. Once power is restored to the system, system operation returns to the startup mode, indicated at "A" on the flow diagram of FIG. 2.

Since the Power Failure flag is now true, the system checks to see if a recovery was in progress. If not, as indicated at 110 in FIG. 2, the recovery table and active task table in RAM are stored on the disk along with the Data Base Status flag. The Recovery Table Present Status flag is set to true and written on the disk as well. After the Power Failure flag is reset, the system operation returns to the startup mode.

The startup operation is identical to that described above in connection with FIG. 2. When system operation reaches the point where it checks to determine whether a recovery table is present, as indicated at 50 in FIG. 3, if operating in a recovery mode, it will find that this flag is true. In this case, the recovery table and the active task table which were stored on the disk as the result of a power failure or a software detected error, are transferred from the disk back into RAM, as indicated at 120 in FIG. 3. A Recovery in Progress flag in memory is then set to true.

When this flag is checked, as indicated at 56 in the flow diagram of FIG. 3, the system will now find that the flag is true, indicating that a recovery is in progress. This condition is displayed on all the terminals to tell the users to stand by. The system then schedules a task to perform application error recovery for each active task identified in the active task table, as indicated at 126 and described in detail in connection with the flow diagram of FIG. 7. When application error recovery has been completed for each of the active tasks, the Recovery in Progress flag is reset to false and the system is ready to resume normal operation.

Figure 7:
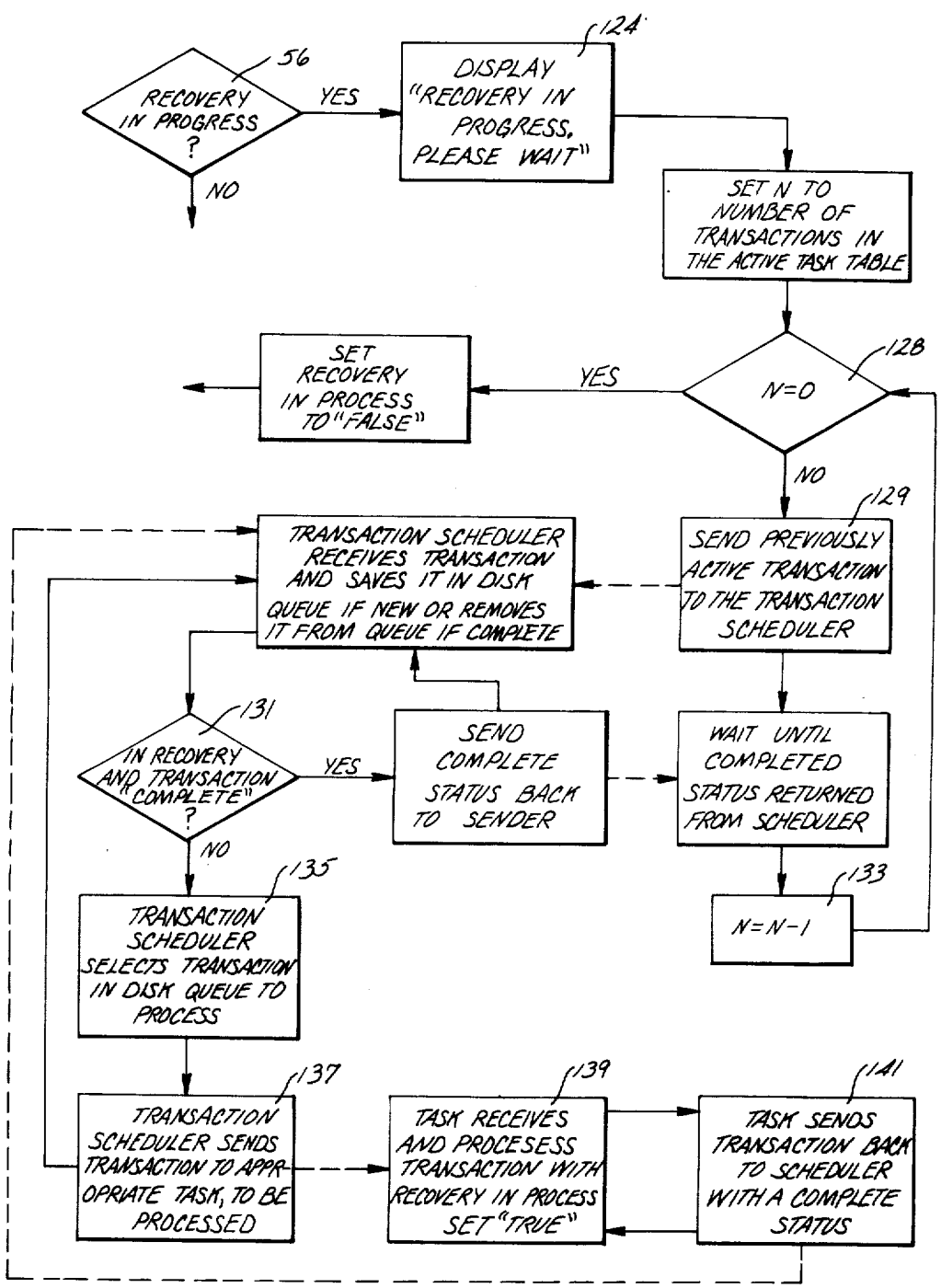
FIG. 7 is a flow chart of system operation with error recovery in progress.

Referring to FIG. 7 in detail, if a recovery is in progress, as determined at 56, N is set to the number of transactions in the active task table in memory. If N is not equal to zero, the first transaction identified in the active task table is sent to the scheduler. The transaction scheduler, just as in normal operation described in connection with FIG. 6, saves the transaction in the disk queue. The scheduler then checks to determine whether the recovery and the transaction are complete, as indicated at 131. If so, the complete status causes the scheduler to remove the transaction from the queue and returns operation to the system. The value of N is then decremented by 1, as indicated at 133. If N is still not zero, the next transaction in the active task table is sent to the scheduler. If a transaction is not complete, the transaction scheduler selects a transaction in the disk queue to process and sends the transaction to the appropriate task to be processed, as indicated at 135 and 137 in FIG. 7. The particular task receives and processes the transaction with the Recovery in Progress flag set true, as indicated at 139. When the task is complete, it sends the transaction back to the scheduler with a complete status, as indicated at 141. It will be seen that the operations of FIGS. 6 and 7 are similar except that the transactions are received from the active task table rather than from the terminals, and the particular task called for by the transaction is processed with the Recovery in Progress flag set to true rather than being set to false.

Figure 8:
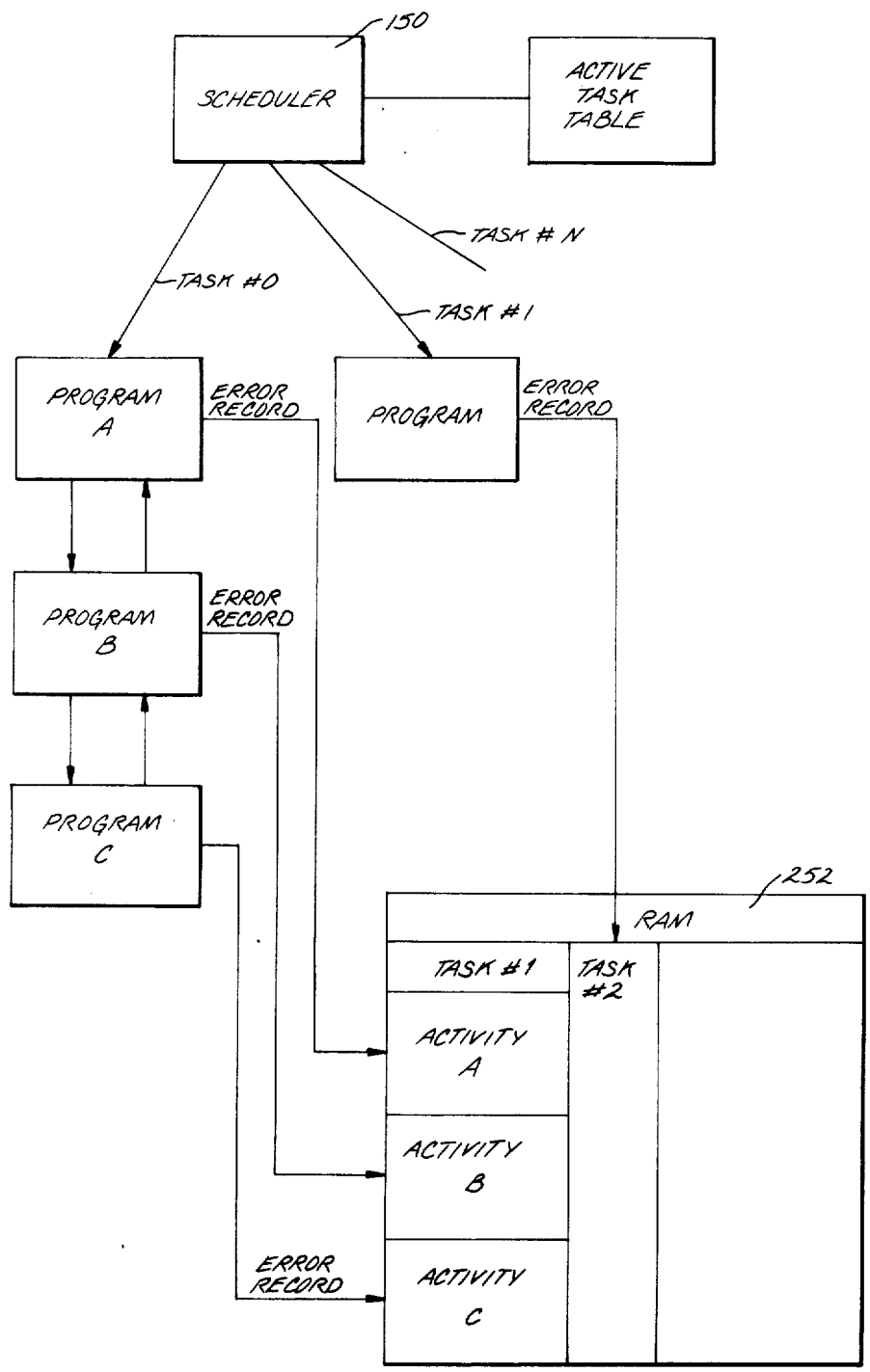
FIG. 8 is a block diagram showing schematically the operation of a multi-program system having error recovery recording in memory.

As pointed out above, each task involving modification of the data base for processing a transaction initiated by a user terminal incorporates its own recovery procedures within the task program. Each program is responsible for recording the information that is necessary for error recovery to be successful. These recordings occur to identify the phase in which the program is currently processing, and the critical information is collected and grouped by task in the error recovery table. While this procedure can be implemented for each task as a whole, it may be more convenient in designing the error recovery procedure for a given task to be divided into a number of separate nested activities with each activity recording data in memory. If an activity is completed successfully, the recorded recovery data for that activity may be deleted from memory. Thus, as shown in FIG. 8, the data base management system uses the scheduler, indicated at 150, to activate the tasks necessary to process the transactions initiated by the various user terminals. Each task has a recording area in RAM, indicated at 152, in which error recovery data is stored. Each task may be subdivided into nested subroutines, indicated as program A, program B, and program C under task No. 1. Each subroutine, referred to as an activity level, provides error recording with an associated area in RAM.

Referring again to FIG. 5, each task has an area set aside in memory, referred to as a task anchor. The anchor for each task comprises a heading for storing link addresses or pointers to first and last activity recording areas in RAM. These activity recording areas are set aside by each activity within a task. Thus, as shown in FIG. 5, the first or highest level activity sets aside a first recording area. A forward link address pointing to the location of the first recording area is stored in the task anchor. A backward link pointing to the same recording area is also stored in the task anchor. An activity header for the first recording area for each task is now provided with a forward link and a backward link, both of which point to the task anchor, assuming there is only a single recording area for that task. If there are two or more recording areas, such as would be required for program B and program C, these additional recording areas are provided with forward and backward links which provide both forward and backward loops for linking the task anchor and each of the activity recording areas for the particular task in a "chain". The activity header for the anchor and each activity, in addition to the forward and backward links, include the size of the recording area, a Lower Status flag, which indicates the status of the next lower activity level in the task, and a Checksum value. In addition, a Data Ready flag is provided in each recording area and set true when the activity recovery data is initialized. This flag is checked during recovery as a precaution against use of incomplete data. A recovery identification indicating the activity level within the task is also recorded.

Individual data items stored in an activity recording area are set by calls embedded in the application program at the particular activity level to "activity set byte", "activity set word" and "activity set double word". Each of these calls is used to assign a value to a byte, word or double word variable in the recovery data structure. An "activity start" call procedure is used to mark the start of an activity for recovery purposes. It establishes the number of bytes of local data to be reserved for recording information for the particular activity level and establishes a pointer variable for the base structure which defines the local data for the particular activity level. Two other procedure calls for the error recovery recording services are required, an "activity data ready" call which is used to mark the fact that the variables in the current recovery data structure have been assigned initial values, and an "activity end" call which marks the exit from an activity and operates to discard all data associated with the current activity level. Each of the above listed call procedures used for recording error recovery data during execution of a task is described in more detail in connection with the flow diagrams shown in FIGS. 9-16.

Figure 9:
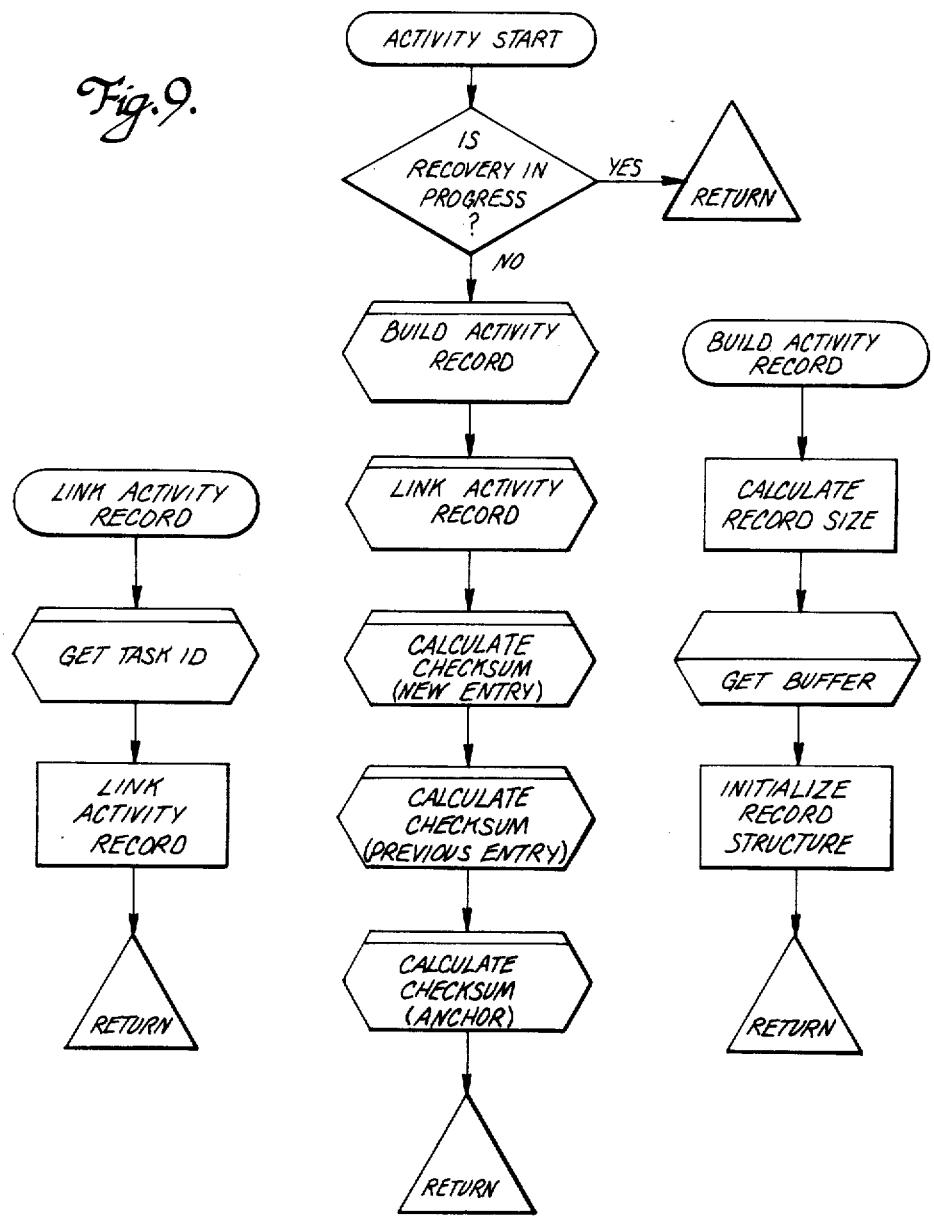

The "activity start" call, shown in detail in FIG. 9, is used to establish a recording area during execution of an activity within a particular task. As pointed out above, a single task may consist of a single activity or a series of activities, as outlined above in connection with FIG. 8. When an "activity start" call procedure is encountered during execution of a program, a subroutine is executed which first checks to make sure that the Recovery in Progress flag is false, since the recording services are not invoked during a recovery. If a recovery is in progress, the "activity start" call procedure immediately terminates and returns to the activity program. However, if a recovery is not in progress, the "activity start" program then builds a recording activity area in memory by first calculating the record size required. This is determined by adding the number of bytes required for the heading of the recording area to the amount of memory defined by the application program that is required to store the required error recovery data. The operating system then sets aside a buffer area in memory of the required size, and the memory area is initialized. The "lower status" is initialized to a Normal status to indicate no lower level activity has been called.

After the activity recording area is built, the recording activity area is linked to the task anchor through the forward link and to the next higher level recording area through the backward link, as illustrated in FIG. 5.

After the recording area is established for the particular activity by the activity start call and linked to the task anchor and to the next higher activity level recording area, the checksums for the new recording area, the previous recording area and the anchor are all recalculated and stored in the respective headings to complete the activity start operation. Also the "lower status" in the previous or next higher activity level heading is set to No Data to indicate no data has yet been stored in the current activity recording area.

Figure 12:
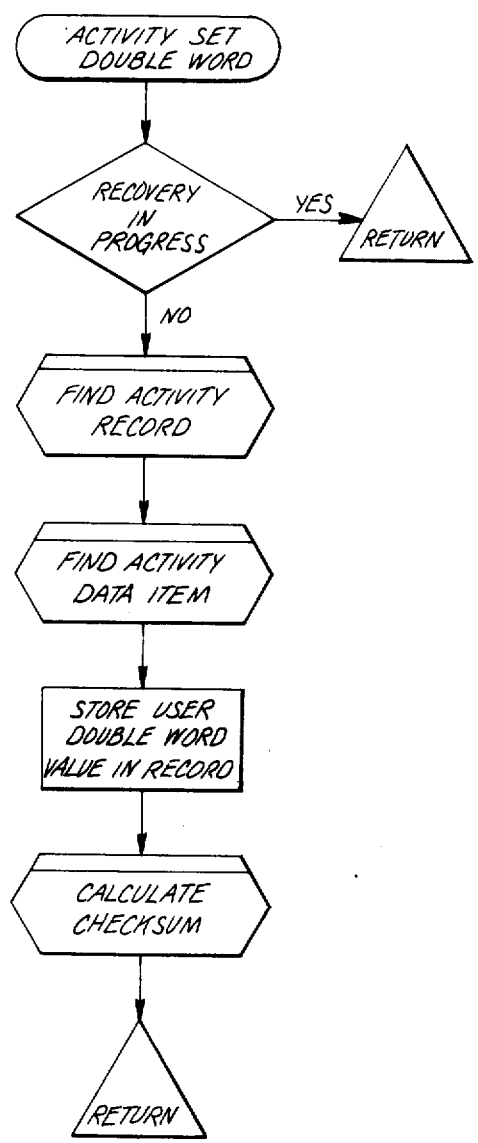
Figure 15:
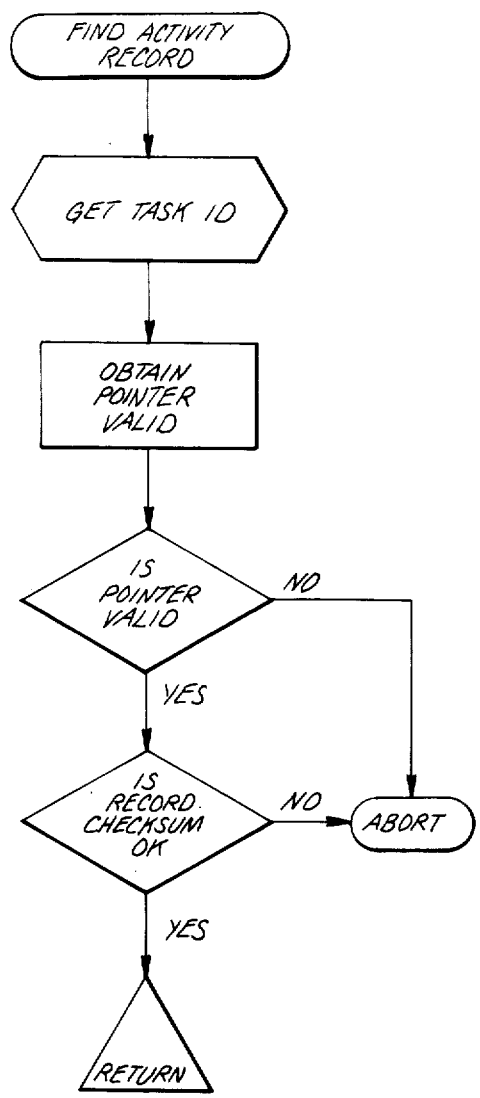
Figure 16:
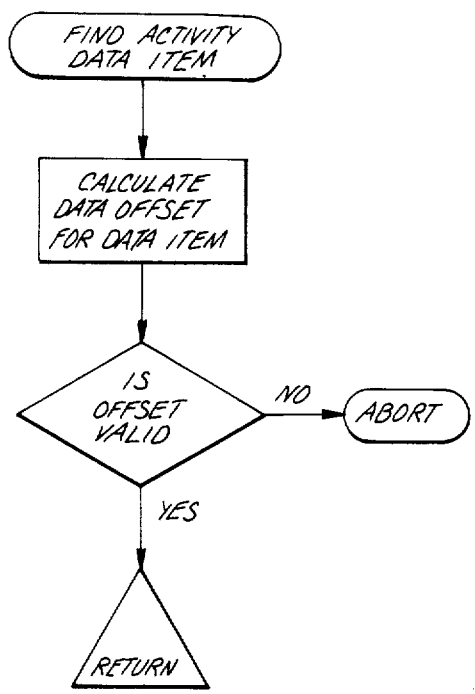

Once a recording area is established in memory for use by a particular activity, the application program within that activity may store a byte, a word (two bytes) or a double word (four bytes) into the recording area in response to a set byte call, a set word call or a set double word call, shown respectively in FIGS. 10, 11, and 12 In each instance, a check is first made of the Recovery in Progress flag. If it is not true, the program finds the activity recording area, as shown in FIG. 15, finds the activity data item location in the data recording area, as shown in FIG. 16, and stores the byte, word, or double word, as the case may be in the item location. To find the activity record, as shown in FIG. 15, the operating system first gets the task I.D. from a predetermined location in memory where the operating system stores the I.D. of the active task. The task I.D. determines the location of the task anchor, and the task anchor provides a backward link pointing to the last activity recording area for the particular task.

To find the address of the activity data item where the byte, word or double word is to be stored, the offset of the data address is computed knowing the base address of the recording area and the number of bytes used for the header of the recording area. A new checksum is determined and stored in the header after the byte, word or double word has been stored in the memory. Thus by using one of these three calls, an application program can provide for error recovery by storing information generated during the execution of the program in a specified recording area set aside in memory.

Figure 13:
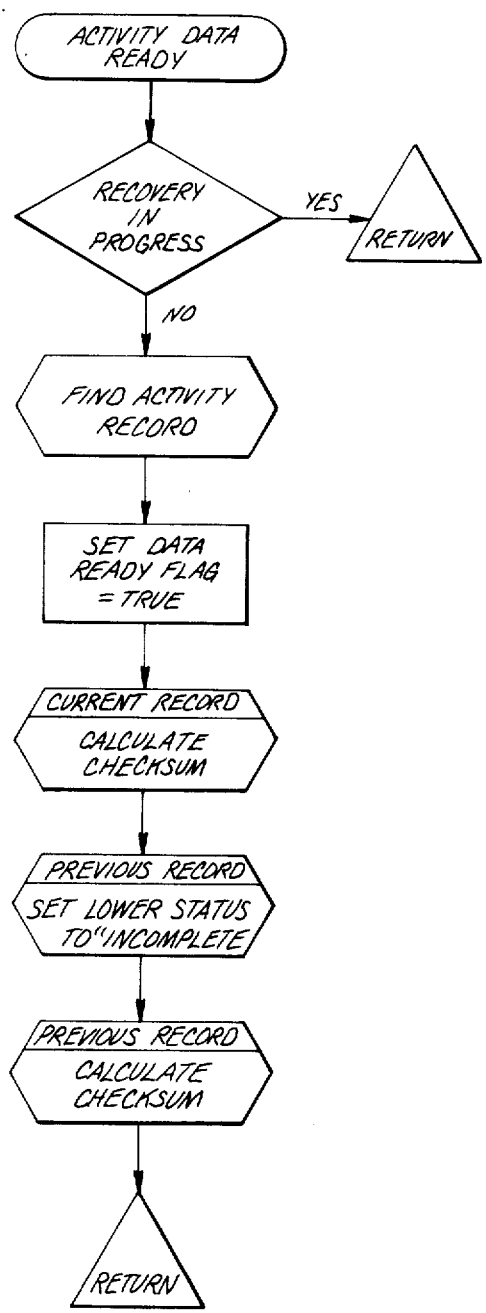
Figure 14:
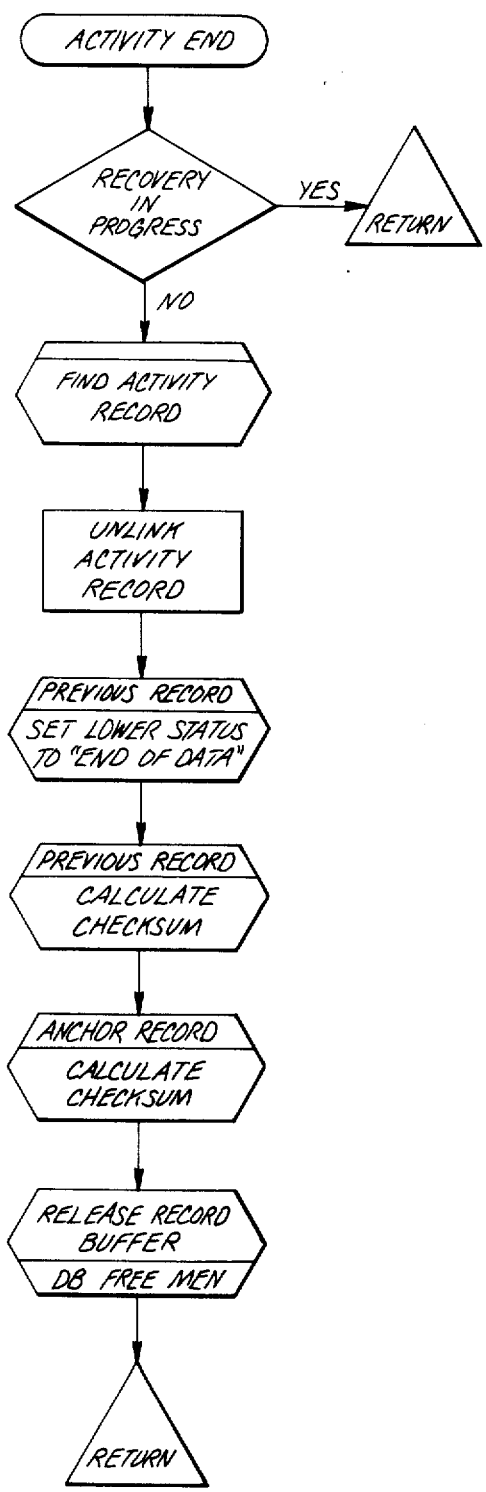

When the application program has stored enough information in the recording area in memory to be able to make a recovery following a software error or power failure, the Data Ready flag in the recording area is set using an "activity data ready" call, as shown in FIG. 13. Again, after checking to see that the Recovery in Progress flag has not been set true, the particular activity recording area in memory is located and the Data Ready flag in the heading is set true. After calculating a new checksum, the "lower status" in the header of the previous activity recording area in the memory is set to Incomplete, indicating that the next current activity level has completed the storage of recovery data but not called "activity end". A new checksum for the previous or higher level recording area is recalculated before exiting the "activity data ready" call.

Before exiting a completed activity program, an "activity end" call is used to remove the associated recovery recording area in the memory. The "activity end" call, as shown in detail in FIG. 14, again checks to determine whether the program is being executed in the recovery mode. If not, the "activity end" call then finds the activity record in memory and unlinks the recording area from the chain which links the anchor to the recording areas for the other activity levels. Since this involves changing the forward and backward link addresses in the anchor and in the previous or next higher order activity level recording area, a new checksum is computed for both the previous recording area heading and for the anchor heading. The recording area is then released so that that area of memory can be available for other uses. Also the "lower status" of the higher level recording area heading is changed to an End of Data status, indicating the lower level program routine has been completed.

Figure 17:
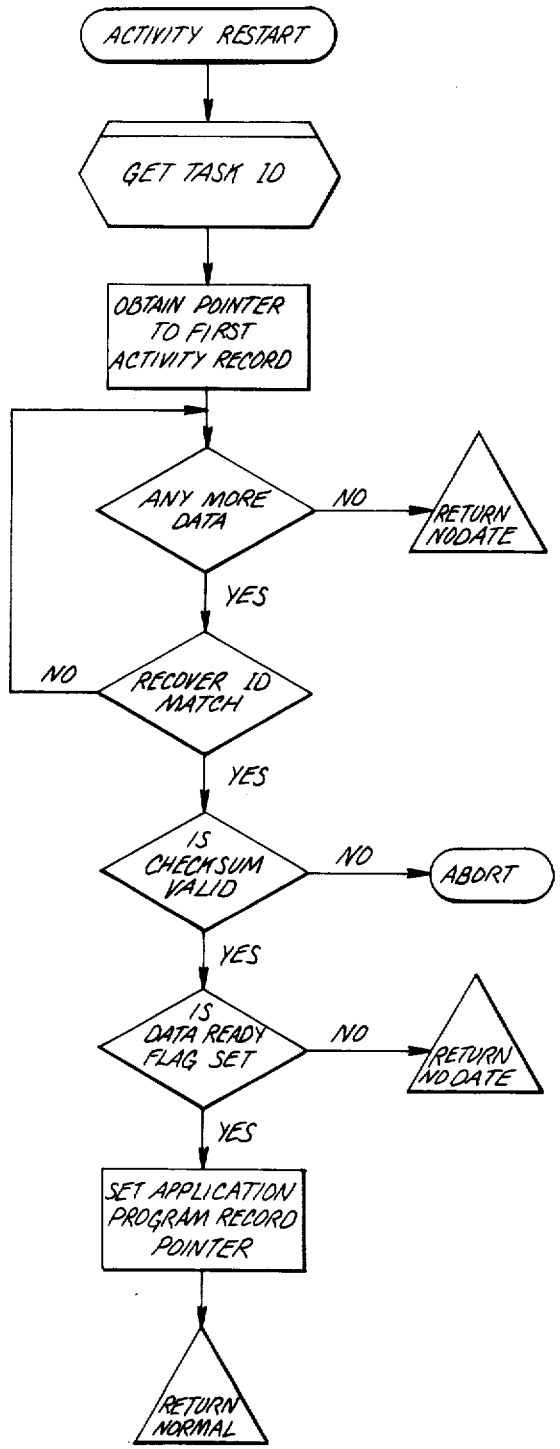
Figure 21:
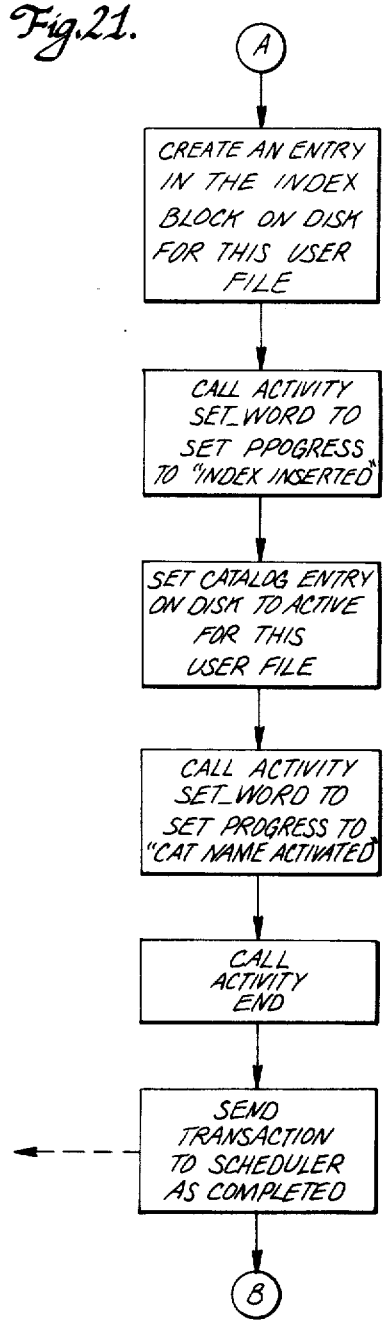

Special calls are also used during the error recovery operation to locate the data recorded by the application program prior to the occurrence of the error condition. These include the "activity restart" call, described in connection with the flow diagram shown in FIG. 17. When the "activity restart" call is encountered, it gets the task identification from the table in memory. The task identification points to the task anchor and is used to obtain the forward link address from the corresponding task anchor in memory. The forward link points to the first or highest activity level error recovery recording area for the particular task, as described above in connection with FIG. 5. The recovery identification recorded in the header of the first recording area is then checked to make sure there is a match with the user recovery identification previously stored in the header of the recording area. If there is a match and the checksum is valid, the Data Ready flag in the header is checked to make sure active data has been recorded. If so, a pointer to the beginning address of the recorded data is set and returned to the main program.

An "activity lower status" call is also provided for use by the application program which operates to return the lower status information stored in the header of an activity recording area in memory. As shown in FIG. 18, this call routine gets the task identification and then obtains the forward link address from the anchor header. From the highest level activity record, it obtains the recovery identification stored in the header; and if it matches the desired activity level, a checksum is made and the lower status information in the header is returned to the main program.

An "activity restart end" call, shown in FIG. 19, is used to erase the activity record in memory. It functions to erase all activity levels associated with the particular task in memory. The "activity restart end" call gets the task identification which points to the anchor header. From the anchor header, it gets the forward link address which points to the header of the first recording area for the particular task. If there is a record, it updates the anchor links to bypass the activity level and releases the record area in memory. This loop is repeated until all of the recording areas associated with a particular task have been released. A new checksum for the task anchor is then computed, and the call returns to the main program.

To better understand the invention, operation of the system in executing the user task for creating a new file in the data base is summarized by the flow diagrams of FIGS. 20, 21, 22, and 23. As described in connection with FIG. 6, the scheduler initiates the appropriate task to be processed. In the example, the task to be processed is the Create File task. When the Create File transaction is received from the scheduler, the Recovery in Progress flag is checked. Assuming it is false, so that the normal operation is in progress, the "activity start" call, described above in connection with FIG. 9, is initiated by the task program. As a result, the recording area for storing error recovery data is set aside in memory and the heading information of the first or highest activity level recording area for the particular task is initialized in the manner described above. In the present example, it is assumed that the Create File task does not have any nested activity levels and so no more than one recording area for error recovery is required. Once the recording area is set aside in memory, linked to the task anchor, and initialized, an "activity set word" call is used to set a progress word in the recording area to a null condition. An "activity set double word" call is used to set a detail block number to zero in the recording area, and an "activity set word" call is used to set the user file in the recording area to zero. An "activity data ready" call is then executed (see FIG. 13) to set the Data Ready flag in the heading of the recording area to true. The Create File task then proceeds to reserve the next user file number and create a user file description block on the disk. The block number is then recorded in the error recovery recording area by an "activity set double word" call. An "activity set" call is then used to change the progress word to indicate the progress detail by the task.

The Create File task then creates an entry in the index block on a disk for this new user file, and an activity set word records a progress word in the recovery recording area to indicate that the index has been inserted. The Create New File task then sets a catalog entry on the disk to indicate that this new user file is active. An "activity set word" call then records as data in the activity recording area that the task has progressed to setting the catalog entry to "active". An "activity end" call is then executed (see FIG. 14). This removes the error recovery recording area from memory and completes the execution of the Create File task. The transaction is returned to the scheduler as completed.

It will be seen that each particular application program for executing a particular task involving modification of the data base has embedded in the program calls which set up the recording area in memory for the recovery. Then progress information is recorded in the recording area in memory and the Data Ready flag is set. If the task is completed without any error condition arising, the recording area is released before the task returns operation to the scheduler.

In the event that an error condition arises before a task is completed, the task is again scheduled but with the Recovery in Progress flag set to true, as described above in connection with FIG. 7. If the Recovery in Progress flag is true, the program calls a Create File Recovery program, as shown in the flow diagram of FIG. 20. The recovery subroutine is shown in detail in the flow diagram of FIGS. 22 and 23. The subroutine first calls an "activity restart" which, as described above in connection with FIG. 17, returned a pointer to the associated recording area in memory where the recovery data was recorded prior to the occurrence of the error condition. Using the pointer, the program checks the status of the recording area to determine whether there is active data recorded. If no data is recorded, the program checks to see whether the catalog entry on the disk is active for the particular user file. If the catalog entry on the disk is not active, this indicates that the transaction was completed at the time the error was encountered. The program therefore calls an "activity restart end". This call returns a "normal" status which causes the transaction to be sent to the scheduler as complete. If the catalog entry on the disk is active, the return status is set to "incomplete" to indicate the transaction has not started. Under these conditions, the program returns to the main program of the Create File task, as indicated in FIG. 20, to be rescheduled.

Figure 23:
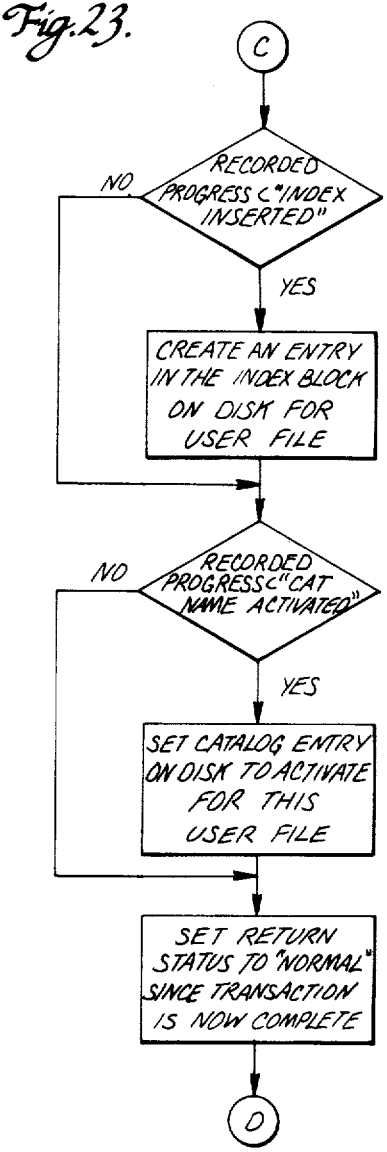
Figure 22:
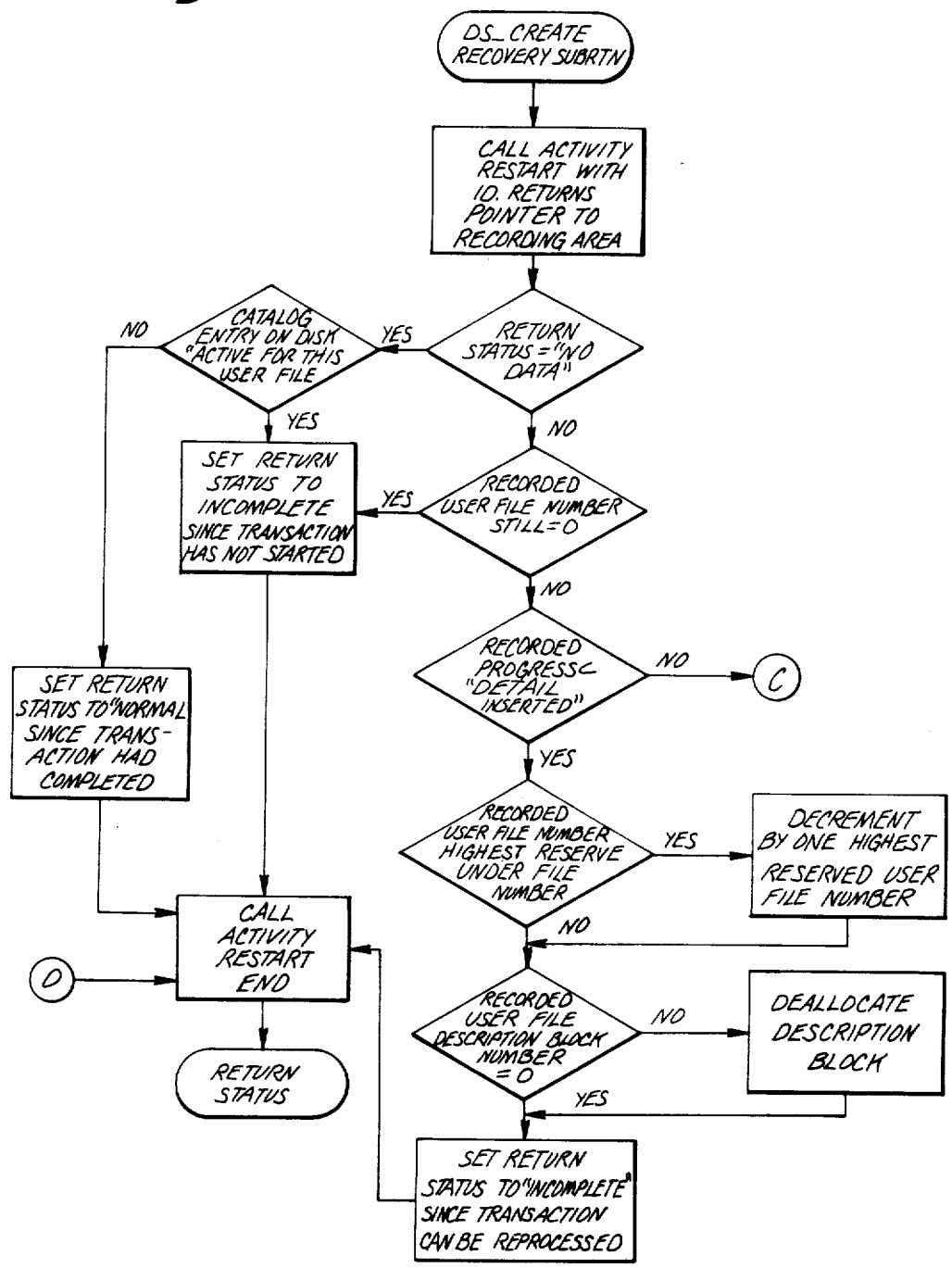

If there has been data recorded in the recording area, this indicates that the task had been partially executed at the time the error condition occurred. In this case, as shown by the flow diagram of FIG. 22, the program checks to determine if the recorded user file number is still zero. If so, the recovery operation is terminated by setting the return status to "incomplete" and returning the transaction to the scheduler. However, if a file has been created so that the file number is other than zero, the recorded data is used to determine if the task reached the progress point where "detail inserted" was completed before the error condition occurred. If the task had reached this point, the program branches to "C" in the flow diagram, as shown in FIG. 23. However, assuming the task had not progressed to this point in the program, the subroutine compares the user file number with the highest reserve user file number. If the reserve number is greater than the file number, the reserve number is decremented by 1. If a description block number has been allocated so that it is not equal to zero, the block number is deallocated, the return status is set to "incomplete", the "activity restart end" call is executed, and the operation is returned to the scheduler to be rescheduled. Thus, in effect, the error recovery procedure has backed out of the task, leaving the data base in the same status it was in before the Create File task was initated prior to the error condition.

If the Create File task has proceeded to the point where it had progressed to the "detail inserted" status, the recovery program goes forward, as shown in FIG. 23, and determines whether the program had progressed to the point where an index had been inserted on the disk. If it had not progressed to this point, the program creates an entry in the index block on the disk for the user file. The recovery program then checks to determine if the task had progressed to the point where the catalog name was activated. If not, the program sets the catalog entry on the disk to an active state for this user file. The return status is set to "normal" since the Create File task is now a completed transaction.

From the above description, it will be seen that each task includes procedures for recording progress data in a specified area or areas in memory during execution. The data stored in these areas are retained on the disk in the event of an error that interrupts the execution of a task. During a subsequent error operation, the data is restored to the memory and used by the task to either complete the task or back out of the task in a way that does not corrupt the data base. This allows automatic system recovery from software errors or power loss. Recovery data is recorded in memory and then discarded to allow new data to be recorded as task execution progresses without an error condition occurring.

What is claimed is:

1. In a data base management system having a plurality of application programs capable of concurrently executing a plurality of tasks with respect to a data base located in a non-volatile bulk memory, a method of providing said system with the capability of recovering from an unexpected interruption in system operation without corrupting the data base, said method comprising:

allocating a task recovery area in a random access memory during the initial processing of each task which may modify the data base;

independently recording task recovery data during the execution of each such task in its respective task recovery area to the extent required to provide recovery for the task without data base corruption in the event of an unexpected interruption in system operation while the task is executing, said independently recording task recovery data occuring in response to instructions embedded in the application programs used for executing the task;

de-allocating each task recovery area in response to deactivation of the task as a result of its successful completion;

transferring recovery data in said recovery areas to said bulk memory in response to the occurence of an unexpected interruption in system operation while a task is executing;

during system recovery operations, returning the recovery data transferred to said bulk memory in response to said interruption back to said task recovery areas in said random access memory; and then independently performing task recovery operations for each task which was active when the unexpected interruption occured using the recovery data returned to its respective task recovery area, said task recovery operations being performed in a manner such that the integrity of the data base is maintained, said independently performing task recovery operations occuring in response to instructions embedded in the application programs used for executing the task.

2. The invention in accordance with claim 1, wherein the recovery data stored by each active task in its task recovery area during task execution includes task progress data.

3. The invention in accordance with claim 3, wherein the steps of independently performing task recovery operations for each task includes interrogating the respective task recovery area and in response to said progress data either completing the task or backing out of the task and then re-executing the task.

4. The invention in accordance with claim 1, including the steps of recording an active task identification in an active task table in said random access memory when a task is activated, transferring said table to the bulk memory in response to said interruption along with said task recovery areas, and returning said active task table to said random access memory along with said task recovery areas during said system recovery operations.

5. The invention in accordance with claim 4, including the step of interrogating said table to determine the tasks for which the step of independently performing task recovery operations are to be performed.

6. The invention in accordance with claim 5, wherein the step of allocating includes storing data identifying the locations of allocated task recording areas in said table, and wherein the steps of independently recording task recovery data and independently performing task recovery operations refer to said table for determining the location of the respective recovery area allocated for each task.

7. The invention in accordance with claim 6, further including the steps of recording a flag in each task recovery area indicating if the data recorded therein is ready for use durng recovery, testing the flag in response to said interruption, and inhibiting the transfer of a task recovery area to the bulk memory until the flag indicates that the data is ready for use during recovery operations.

8. The invention in accordance with claim 7, further including the steps of determining when said task recovery tables have been stored in said bulk memory, and in response thereto initiating system recovery operations.

9. The invention in accordance with claim 1, wherein a task may comprise a plurality of nested activities, wherein the step of allocating includes dividing the task recovery area of such a task into linked activity recovery areas, and wherein the step of independently recording for such a task includes recording recovery data during the performance of each nested activity in a respective activity recovery area.

* * * * *

UNITED STATES PATENT AND TRADEMARK OFFICE
CERTIFICATE OF CORRECTION

PATENT NO. : 4,697,266

DATED : September 29, 1987

INVENTOR(S) : Rufus E. Finley

It is certified that error appears in the above-identified patent and that said Letters Patent is hereby corrected as shown below:

Column 8, line 21, "12" should be --12.--.

Column 12, line 10, "occuring" should be --occurring--;

line 16, after "said" insert --task--;

line 17, "occurence" should be --occurrence--;

line 26, "occured" should be --occurred--;

line 31, "occuring" should be --occurring--;

line 39, "steps" should be --step--;

line 67, "durng" should be --during--.

Signed and Sealed this

Fifth Day of April, 1988

*Attest:*

DONALD J. QUIGG

*Attesting Officer*         *Commissioner of Patents and Trademarks*